Figure 1:
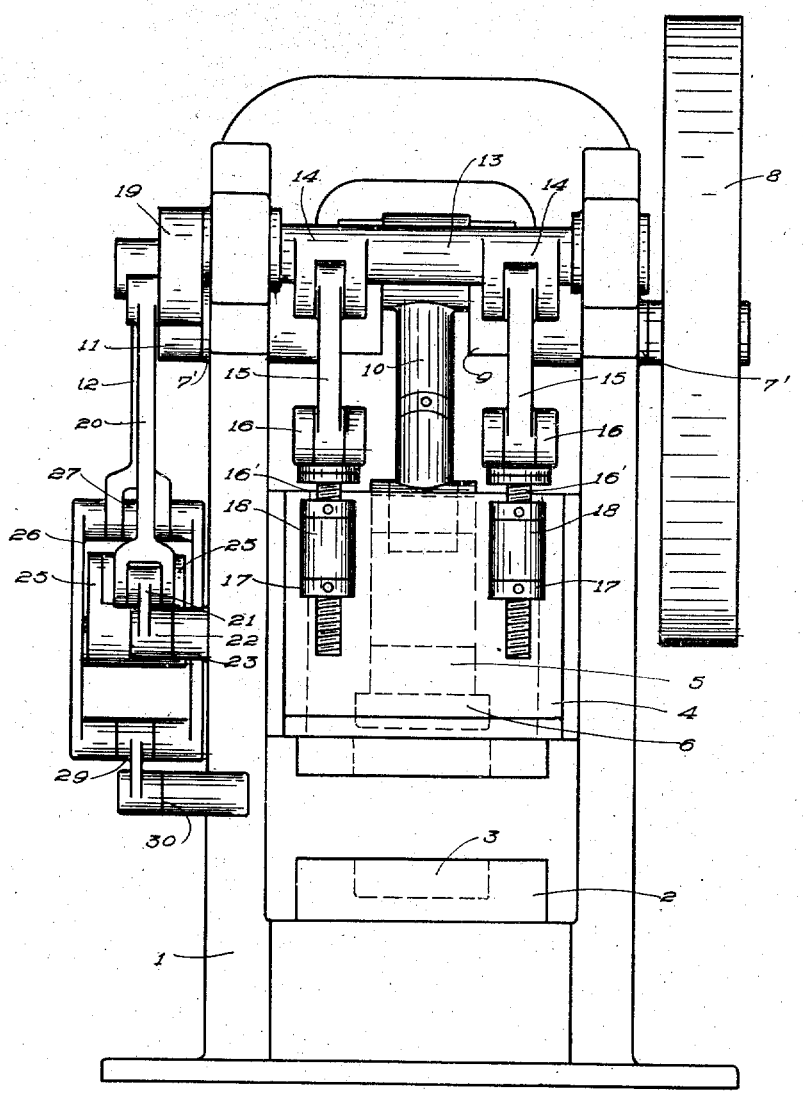

No. 12,462.

REISSUED MAR. 13, 1906.

P. M. H. LANGE.

DRAWING PRESS.

APPLICATION FILED DEC. 30, 1905.

4 SHEETS—SHEET 1.

WITNESSES:
Lowell Schreiber
Mary I. Shay

INVENTOR:
Paul M. H. Lange,
By Overton & Quinn
His attorneys.

No. 12,462. REISSUED MAR. 13, 1906.

P. M. H. LANGE.

DRAWING PRESS.

APPLICATION FILED DEC. 30, 1905.

4 SHEETS—SHEET 2.

WITNESSES:
Lowell Schreiber
Mary I. Shay

INVENTOR:
Paul M. H. Lange,
By Owen & Owen
His attorneys.

No. 12,462. REISSUED MAR. 13, 1906.

P. M. H. LANGE.

DRAWING PRESS.

APPLICATION FILED DEC. 30, 1905.

4 SHEETS—SHEET 3.

WITNESSES:
Lowell Schreiber
Mary I. Shay.

INVENTOR:
Paul M. H. Lange,
By Dewey & Owen,
His attorneys.

No. 12,462. REISSUED MAR. 13, 1906.

P. M. H. LANGE.

DRAWING PRESS.

APPLICATION FILED DEC. 30, 1905.

4 SHEETS—SHEET 4.

WITNESSES:
Lowell Schreiber
Mary I. Shay.

INVENTOR:
Paul M. H. Lange
By Owen & Owen
His attorneys.

UNITED STATES PATENT OFFICE.

PAUL M. H. LANGE, OF TOLEDO, OHIO, ASSIGNOR TO THE TOLEDO MACHINE AND TOOL COMPANY, OF TOLEDO, OHIO, A CORPORATION OF OHIO.

DRAWING-PRESS.

No. 12,462. Specification of Reissued Letters Patent. Reissued Mar. 13, 1906.

Original No. 801,996, dated October 17, 1905. Application for reissue filed December 30, 1905. Serial No. 294,025.

*To all whom it may concern:*

Be it known that I, PAUL M. H. LANGE, a subject of the German Emperor, residing at Toledo, in the county of Lucas and State of Ohio, have invented a new and useful Improvement in Drawing-Presses, of which the following is a specification.

My invention relates to a drawing or forming press, and has for its object to provide a convenient and efficient press of the kind whereby blanks of sheet metal may be readily compressed and drawn into desired forms of vessels and the like in a single operation of the press for each blank during a continuous reciprocation of the press-plunger.

A further object is to provide a press of the kind wherein mechanism operated by the driving-shaft produces a differential reciprocation of the blank-holder and the press-plunger whereby the blank-holder precedes the plunger in its engagement of the blank and reaches the limit of its downward movement and pressure on the blank and there pauses and holds the blank marginally pressed on the die-block an increased length of time, while the plunger descends, engages the blank and presses in into the matrix, and then moves upward with the plunger, at first with less speed than the plunger, until the plunger has returned far enough on its upward stroke to release itself from the drawn product, then at a greater speed than the plunger until it has moved upward a distance sufficient to allow the removal of the drawn product, and then again at reducing speed during the completion of its upward movement, thereby allowing sufficient time during the upward movement of the blank-holder for the withdrawal of the product and the substitution of a new blank.

I accomplish these objects by the novel construction, arrangement, and combination of parts hereinafter described, and illustrated in the drawings, in which—

Figure 2:
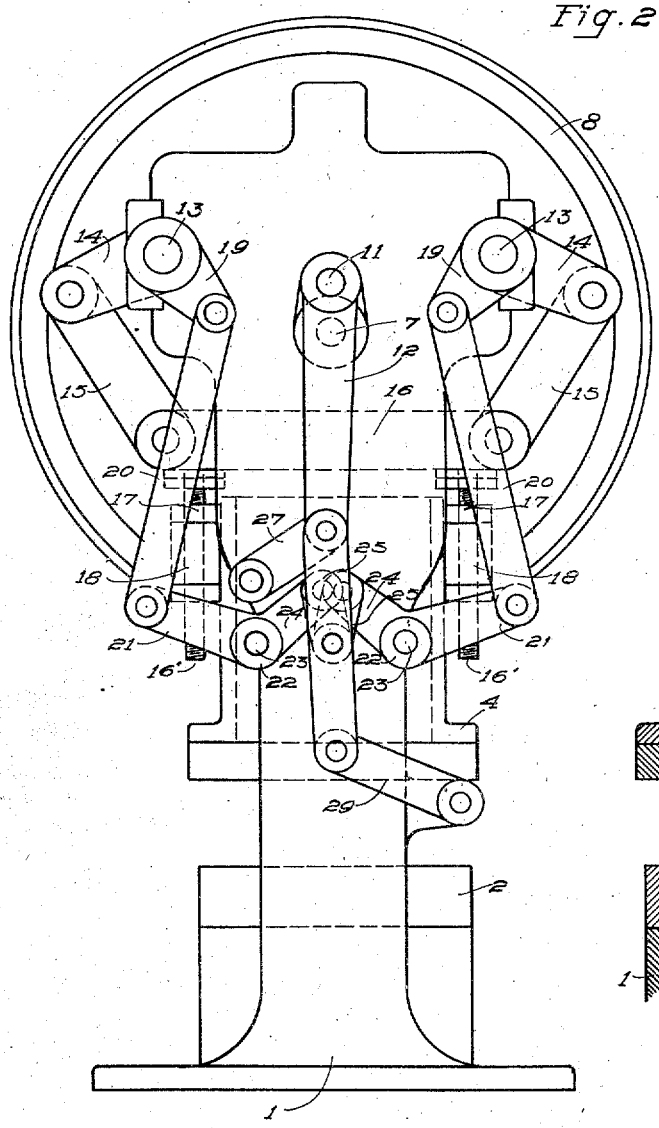
Figure 3:
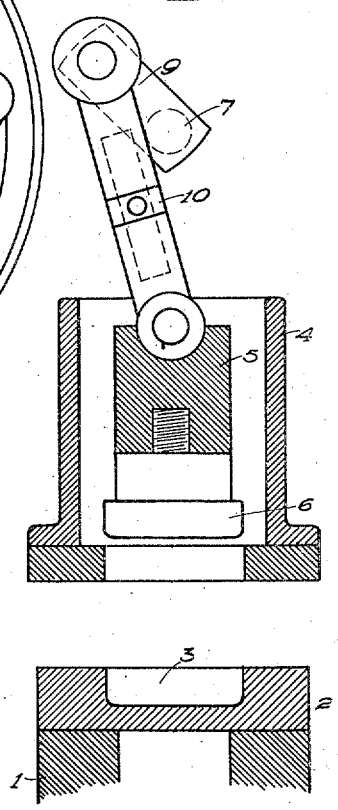
Figure 4:
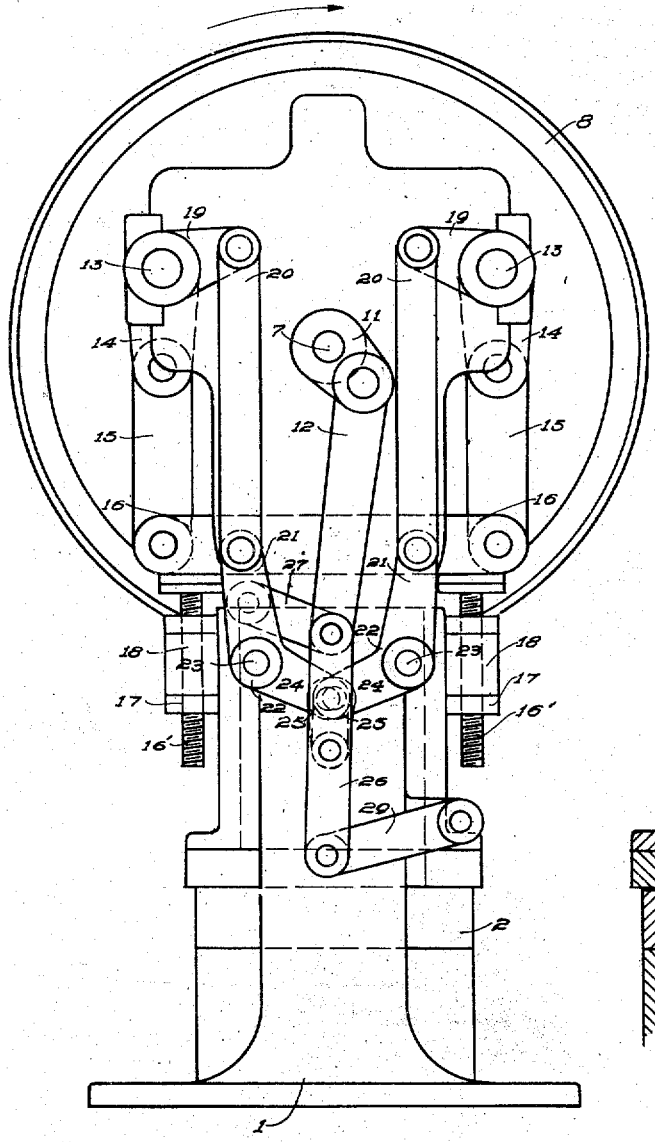
Figure 5:
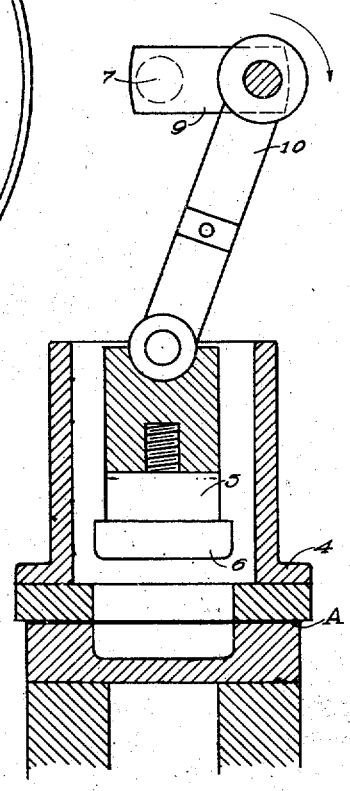
Figure 6:
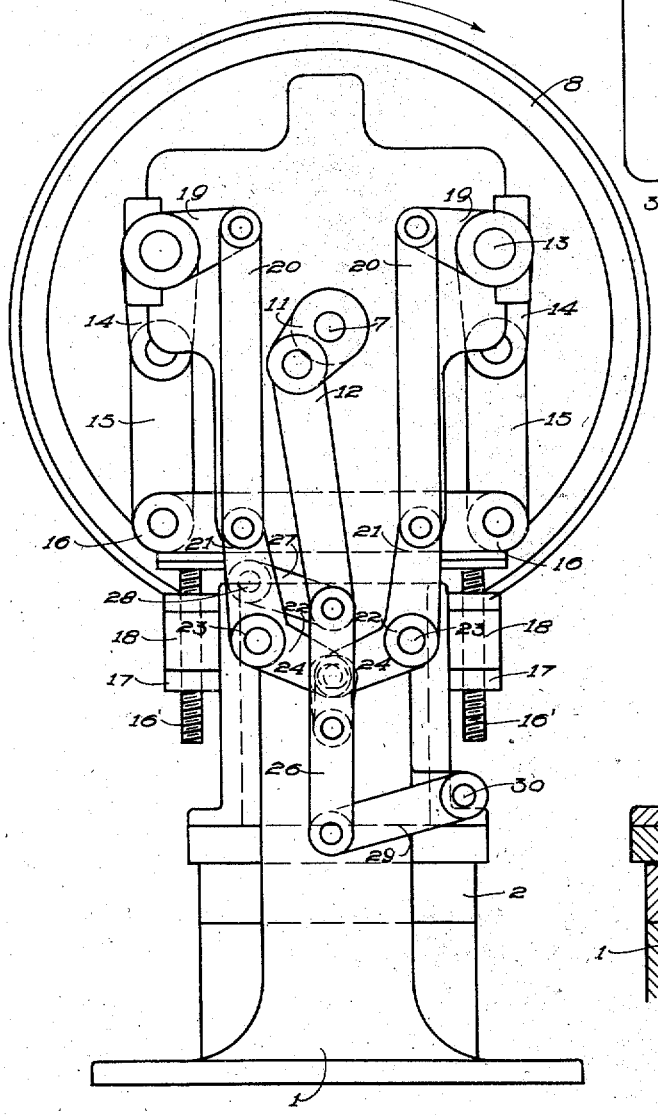
Figure 8:
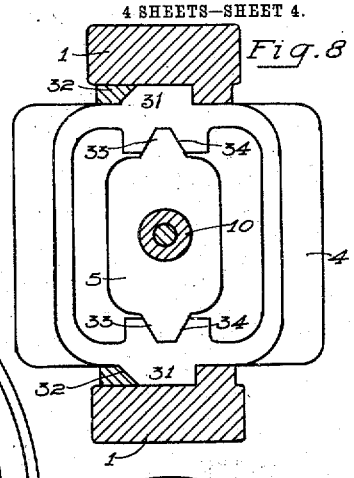
Figure 7:
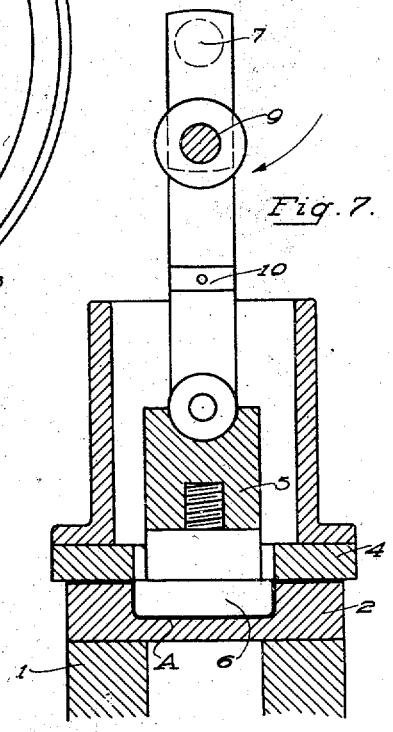

Figure 1 is a front elevation of a press constructed in accordance with my invention. Fig. 2 is a diagrammatic side elevation of the same, showing the relative position of the parts of the blank-holder-operating mechanism when blank-holder has reached the upper limit of its movement. Fig. 3 shows the relative position of the press-plunger to the blank-holder in the upward stroke of the press-plunger when the blank-holder is at the upper limit of its movement. Fig. 4 is a diagrammatic side elevation similar to that shown in Fig. 2, showing the relative position of the parts of the blank-holder-operating mechanism at the beginning of the lower pause of the blank-holder. Fig. 5 shows the position of the press-plunger in its downward stroke at the beginning of the lower pause of the blank-holder. Fig. 6 is a similar view to those shown in Figs. 2 and 4, showing the relative position of the parts of the blank-holder-operating mechanism at the beginning of the upward movement of the blank-holder. Fig. 7 shows the position of the press-plunger at the beginning of the upward movement of the blank-holder. Fig. 8 is a top view of the blank-holder and press-plunger.

In the drawings, 1 represents the body or frame of the press; 2, the die-bed, having a suitable matrix 3; 4, the blank-holder; 5, the press-plunger, having a forming-head 6 suitable to the matrix; 7, the main driving-shaft, having a driving-pulley 8 on one projecting end portion or otherwise suitably geared to any suitable power for turning the shaft; 9, an inner double crank of the driving-shaft, which is located intermediate between the bearings 7′ of the shaft and is operatively connected to the press-plunger by the connecting-rod 10, and 11 an outer crank of the driving-shaft, which is located on the end of the driving-shaft opposite to the driving-pulley and is operatively connected to the operating mechanism of the blank-holder by the connecting-rod or link 12.

Parallel with and on opposite sides of the driving-shaft the frame 1 is provided with the rock-shafts 13, each having a pair of inner rock-arms 14 projecting outwardly in radial alinement, to the free ends of which are pivoted the upper ends of the links or connecting-rods 15, opposite pairs of which have their lower ends respectively pivoted to opposite ends of the cross-heads 16, from which is suspended by the screw-bolts 16′ the blank-holder. The screw-bolts 16′ extend through the upper and lower lugs of brackets 17, integral with or secured to the sides of the blank-holder and through threaded sleeves 18, located between the lugs of the brackets, whereby the blank-holder is adjustably supported from the rock-arms 14 of the rock-shafts 13.

To projecting end portions of the rock-shafts 13 adjacent to the crank 11 of the driving-shaft are respectively secured the outer rock-arms 19, which extend inwardly at equal angles of about ninety degrees from the rock-arms 14 of their respective rock-shafts 13, and to the free ends of the rock-arms 19 are pivoted the upper ends of link or connecting bars 20, the lower ends of which are pivotally connected to the outer ends of the longer arms 21 of the bell-cranks 22, which are pivoted, respectively, on suitable journal-bearings 23, projecting from the side of the frame, as shown in Fig. 1. To the free ends of the inner and shorter arms 24 of the bell-cranks are respectively pivoted the upper ends of the links 25, the lower ends of which are pivoted centrally to a link 26, and the link 26 is pivoted at its upper end to the inner end of a link-arm 27, the opposite end of which extends outward and is pivoted to a suitable stud-journal 28, secured to and projecting from the side of the frame. The lower end of the link 26 is pivoted to the inner end of a link-arm 29, the outer end of which extends oppositely to the outer end of the link-arm 27 and is pivoted on a suitable stud-journal 30, secured to the frame. To the upper end of the link 26 is also pivoted the lower end of the connecting-rod or link 12.

The crank 11 of the driving-shaft is secured thereto, preferably about forty-five degrees in advance of the crank 9 in the direction of its revolution, as more clearly shown in Figs. 2 and 3, 4 and 5, 6 and 7.

The blank-holder 4 is provided with guides 31, which move in guide-grooves 32 of the frame, and the press-plunger 5 is provided with guides 33, which move in grooves 34 in the inner walls of the blank-holder, as shown in Fig. 8.

The operation of the press thus constructed is best seen and understood from the diagrammatic Figs. 2, 3, 4, 5, 6, and 7. It will be seen that the press-plunger is reciprocated by the crank 9 of the driving-shaft between its upper and lower dead-centers and that its reciprocation is continuous according to the law of crank motion. It will also be seen that the reciprocation of the connecting-rod or link 12 by the crank 11 of the driving-shaft will be continuous between the dead-centers of that crank, according to the same law. The lower end of the connecting-rod 12 being pivoted to the inner end of the link-arm 27 will in both its downward and upward movements pass through the arc which the inner end of that arm describes, and the upper end of the link 26, to which the lower end of the connecting-rod 12 is also pivoted, will also pass through the same arc in its reciprocation with the rod 12. It will also be readily seen that the lower end of the link 26 will pass through the arc described by the inner end of the lower link-arm 29, which arc is opposite to that described by the link-arm 27, and that the central portion of the link 26, to which the links 25 are pivoted, will move in the reciprocation of the link substantially in a vertical line extending through the center of the crank 11, according to a lemniscoid-link movement, and that the lower ends of the links 25, moving in the same vertical line, will move the upper ends of the arms 25, which are pivoted to the free ends of the inner arms 24 of the bell-crank levers through the opposite equal arcs described by the arms 24, and that this movement of the arms 24 will produce opposite movement of the outer and longer arms 21 of the bell-cranks through greater arcs, thereby giving increased speed and distance of movement to the lower ends of the link-bars 20, thereby moving the rock-arms 19, which in turn move the rock-arms 14 in the opposite direction, thereby moving the connecting-rods 15, and with them the cross-heads 16, which in turn move with them the blank-holder 4. Tracing now the relative movements of the parts from the time the crank 11 is on its upper dead-center, as shown in Fig. 2, until it returns to that position it will be noted that crank 9, as shown in Fig. 3, is forty-five degrees from its upper dead-center. In this relative position the short arms of the bell-cranks are drawn upward to the upper limit of their movement and the long arms are moved downward to the lower limit of their movement, thereby drawing with them the rock-arms 19 and correspondingly elevating the rock-arms 14, and with them lifting the blank-holder to the upper limit of its movement, as shown in Fig. 2. During a forty-five degree movement of the crank 11 downward from the upper dead-center the crank 9 will be slowly rising to its upper dead-center and completing the upward movement of the press-plunger, and while the distance of downward movement of the crank 11 through the first forty-five degrees is small the long arms of the bell-cranks during the same time move a greater distance, thereby causing an increase of speed in the downward movement of the blank-holder until as the long arms of the bell-cranks approach alinement with the link-bars 20 the speed is again greatly diminished, and the blank-holder slowly descends into engagement with and is pressed on the blank A, located on the die-block as the crank 11 reaches a point forty-five degrees from the lower dead-center of its movement, as shown in Fig. 4. From this point by reason of the near approach of the connecting-rods 15 to alinement with the rock-arms 14 and the connecting-rods 20 to alinement with the bell-crank arms 21 there is substantially a pause in the movement of the blank-holder until the crank 11 has passed forty-five degrees beyond its lower dead-center on its upward movement, as shown in Fig. 6, at which point it will again slowly begin to move the blank-holder upward, but at a less speed than the crank 9, which is then at its lower dead-center, begins to lift the press-plunger, which is thereby slowly at first withdrawn from the drawn product, which is held back by the slower movement of the blank-holder until it is loosened therefrom, after which the bell-cranks begin again to move the blank-holder with increasing speed as the long arms of the bell-cranks more nearly approach the lower limits of their movement. When the crank 11 has reached a point in its upward movement forty-five degrees from its upper dead-center, the speed of the upward movement of the blank-holder begins to rapidly diminish by reason of the outward movement of the links 25, the decreased movement of connecting-rod 12 as the crank 11 approaches its upper dead-center, and by the approach of the cranks 19 to alinement with the connecting-rods 20, all of these factors combining to reduce the speed and distance of movement of the blank-holder and differentiate it from that of the plunger as the crank 11 travels through the forty-five degrees of its approach to its upper dead-center.

The differentiation between the movements of the plunger and the blank-holder is greater during the travel of the cranks 9 and 11 through the lower ninety degrees of their revolution than through the upper ninety degrees, which is due to the fact that the links 20 and the long arms of the bell-cranks and the rock-arms 14 and the links 15 are respectively brought into alinement on the downstroke of the connecting-rod 12, which does not occur on the upstroke, whereby during the ending of the downstroke and the beginning of the upstroke of the blank-holder there is an increased period during which there is no perceptible movement of the blank-holder while the press-plunger is traveling according to the law of movement of its crank, whereas during the travel of the cranks 9 and 11 through the upper ninety degrees of their revolution the relation of the long arms of the bell-cranks to the connecting-rods 20 is such that while there is proportionally less upward movement of the blank-holder than of the press-plunger there is less difference in the speed and distancee of travel between the blank-holder and the plunger between these upper points of their travel than between the corresponding lower points. It is apparent that by this differentiation in travel between the plunger and the blank-holder I secure an even and firm holding of the blank in place during the entire period of drawing, which produces an even and smooth drawing of the blank without the wrinkling or buckling that occurs where there is any relaxation of the pressure of the blank-holder during the process of drawing. It is apparent also that by producing this differentiation of movement between the blank-holder and the plunger entirely by toggle movement, without the use of cams or slide-crank movement, I have avoided the friction and wear incident to such mechanism and have greatly increased the pause of the blank-holder during the operation of drawing without relaxation of its pressure. It is apparent also that variations may be made in the lead of the blank-holder and the relative lengths and location of the parts of the mechanism controlling the movements of the blank-holder without departure from the principle of construction and operation herein shown and described, and I therefore do not limit myself to the exact relations herein shown.

I claim—

1. In a drawing-press, the combination with a frame having a die-block, of a driving-shaft, journaled in the frame, a pair of rock-shafts journaled parallel with the driving-shaft, a pair of inner rock-arms on each rock-shaft, connecting-rods pivoted to the inner rock-arms, a pair of cross-heads pivoted to opposite connecting-rods, a blank-holder adjustably secured to the cross-heads, an inner crank on the driving-shaft, a connecting-rod pivoted to the inner crank, a plunger movably mounted in the blank-holder, and pivoted to the connecting-rod, an outer crank on the outer end of the driving-shaft, leading the inner crank, a connecting-rod 12 pivoted to the outer crank, an upper link-arm pivoted to the frame by one end and extending inwardly and pivoted to the connecting-rod 12 at the other, an extension-link pivoted at one end to the lower end of the connecting-rod 12, a lower link-arm pivoted to the frame oppositely to the upper link-arm, and extending inwardly and pivoted to the lower end of the extension-link, a pair of link-bars pivoted at their lower ends to the extension-link between the upper and lower link-arms, a pair of bell-cranks pivoted at their angles to the frame, said bell-cranks having inner short arms pivoted to the upper ends respectively of the link-bars, outer rock-arms on the ends of the rock-shafts extending oppositely to the inner rock-arms, connecting-rods 20 pivotally connecting the outer rock-arms with the outer ends of the outer arms of the bell-cranks, and means to drive the shaft.

2. In a drawing-press, the combination of a blank-holder, a pair of oppositely-disposed bell-crank levers, a second pair of oppositely-disposed bell-crank levers, means connecting one arm of each of one pair of levers with an arm of one lever of the other pair and means to rock the said levers.

3. In a drawing-press, the combination of a blank-holder a reciprocating member, means to reciprocate said member, a pair of oppositely-disposed bell-crank levers, and a second pair of oppositely-disposed bell-crank levers, means connecting said member with one of the pairs of levers, and means connecting one arm of each lever of one pair with an arm of one lever of the other pair, and means to connect one of the pairs of levers with the blank-holder.

4. In a drawing-press, the combination with a blank-holder, of a crank, a member reciprocally movable by said crank, bell-crank levers having connection with said member, a second pair of bell-crank levers, connections between the corresponding arms of each pair of bell-crank levers and means for connecting the second pair of levers and the blank-holder.

5. In a drawing-press, the combination with the blank-holder, of a crank, a member movable by the crank, a bell-crank lever having an arm in connection with the said member, a second bell-crank lever, means connecting the free arm of the first lever with an arm of the second lever, and connection between the other arm of the second lever and blank-holder, whereby a pause of the blank-holder is occasioned during a portion of the revolution of the crank.

6. In a press of the class described, a blank-holder, a crank, a member having connection with said crank whereby a reciprocal movement is imparted thereto, pivotal arms guiding the movement of the said member, a pair of oppositely-disposed bell-crank levers each having an arm in connection with the said member, a second pair of bell-crank levers having one arm in connection with the free arm of the corresponding lever of the other pair and the other arm in connection with the blank-holder, whereby a pause of the blank-holder is occasioned during a portion of each revolution of the crank.

7. In a drawing-press, a blank-holder, a crank, a reciprocal member movable by said crank, a lever having link connections with said member, a second lever having one arm in link connection with the first lever and the other arm in link connection with the blank-holder.

8. In a drawing-press, a blank-holder, a crank, a reciprocal member movable by said crank, a lever oscillated by the movement of said member, a shaft having a crank-arm thereon, toggle connections between said shaft and blank-holder, and link connection between the crank-arm on said shaft and said lever whereby as oscillation is imparted to the lever the toggles are straightened to lower the blank-holder.

9. In a drawing-press, a blank-holder, a main crank-shaft and pitman, a member reciprocally movable by the pitman, oppositely-disposed bell-crank levers each having independent pivotal link connection with said member, oppositely-disposed auxiliary crank-shafts, toggles connecting each of said latter shafts with the blank-holder, and link connection between the crank of the auxiliary shaft and the associated bell-crank levers.

10. In a press of the class described, the combination with the blank-holder and punch, of a double crank-shaft, a connection between one crank and the punch, a reciprocatory member, a connection between the other crank and said member, a bell-crank lever having connection with said member, an auxiliary crank-shaft, having link connection with said bell-crank lever, and toggle connection between the auxiliary shaft and the blank-holder, whereby to cause a pause of the blank-holder during a portion of the revolution of the main crank-shaft.

11. The combination with the blank-holder and punch, of a shaft having two cranks of different lengths, a pitman connecting the longer crank and punch, a reciprocal member receiving its movement from the shorter crank, oppositely-disposed bell-crank levers each having one arm in link connection with said member, a second set of oppositely-disposed bell-crank levers each having one arm in link connection with the corresponding bell-lever of the first set and its other arm in link connection with the blank-holder.

12. The combination with the blank-holder, of a crank, oppositely-disposed bell-crank levers, a second pair of oppositely-disposed bell-crank levers having one arm in link connection with the blank-holder and the other arm in link connection with the levers of the first-mentioned set correspondingly positioned, and means movable by a revolution of said crank for imparting oscillation to the first-mentioned levers whereby to cause a pause of the blank-holder during a portion of the revolution of the crank.

13. The combination with the blank-holder, of a crank, a bell-crank lever, means for imparting an oscillatory movement to said lever from a turning of said crank, a shaft, toggle connection between said shaft and blank-holder, and means for imparting an oscillatory movement to said shaft from the movement of said bell-lever, whereby the blank-holder is caused to have a reciprocatory movement and to pause at the limit of its downstroke during a portion of the revolution of the crank.

In testimony whereof I have hereunto set my hand in the presence of two witnesses.

PAUL M. H. LANGE.

Witnesses:

CHAS. W. GREENING,

J. EDWARD OWENS.